UNITED STATES PATENT OFFICE.

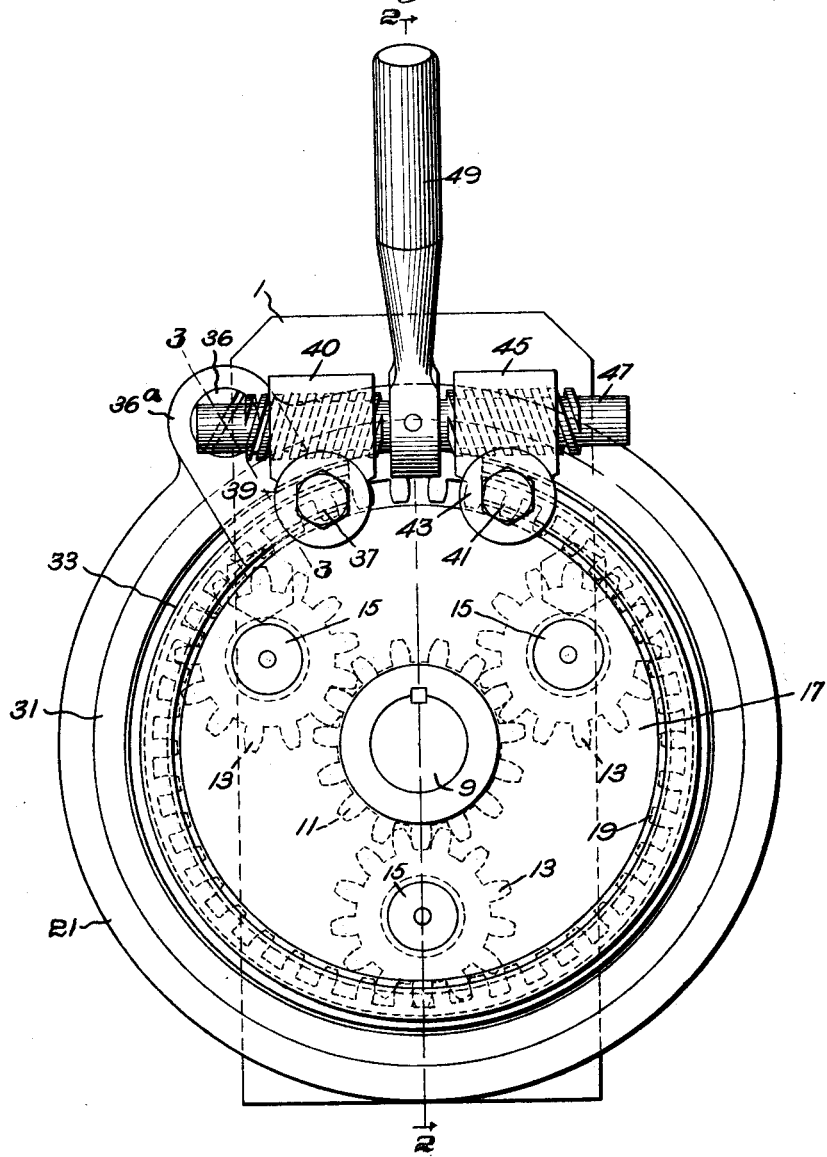

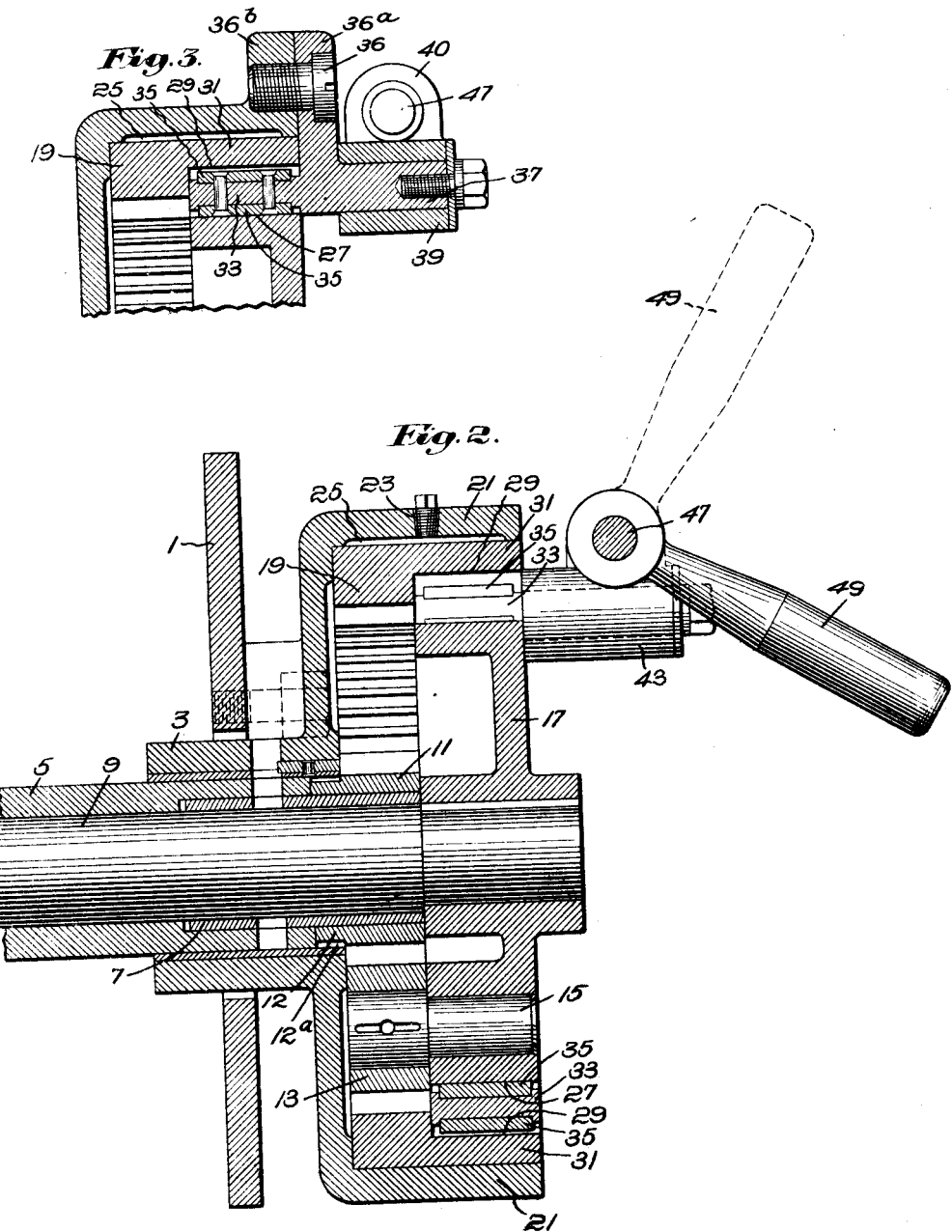

MORRIS P. HOLMES, OF CLAREMONT, NEW HAMPSHIRE, ASSIGNOR TO SULLIVAN MACHINERY COMPANY, OF CLAREMONT, NEW HAMPSHIRE, A CORPORATION OF MASSACHUSETTS.

TRANSMISSION MECHANISM.

1,185,320.  Specification of Letters Patent.  Patented May 30, 1916.

Application filed April 2, 1914. Serial No. 828,981.

*To all whom it may concern:*

Be it known that I, MORRIS P. HOLMES, a citizen of the United States, and a resident of Claremont, New Hampshire, have invented an Improvement in Transmission Mechanisms, of which the following description, in connection with the accompanying drawings, is a specification, like characters on the drawings representing like parts.

This invention relates to transmission mechanisms suitable for power driven mining machine trucks, motor vehicles and other uses, and among other objects provides a simple, compact, effective mechanism either for varying the speed of rotation transmitted from one element to another or for arresting the rotation of one of said elements.

The character of the invention may be best understood by reference to the following description of an illustrative embodiment thereof shown in the accompanying drawings, wherein:

Figure 1 is a side elevation of an illustrative transmission mechanism shown herein as embodying the invention; Fig. 2 is a section taken on line 2—2 of Fig. 1; and Fig. 3 is a sectional detail taken on line 3—3 of Fig. 1.

Referring to the drawing, 1 designates a frame plate through which projects a boss 3 forming a bearing in which is journaled a driving shaft, herein in the form of a sleeve 5 which may be driven by a motor or other appropriate means not shown herein. Within this sleeve is a bushing 7 in which is journaled a driven shaft 9. To transmit rotation from said driving shaft to said driven shaft there is provided a planetary gear mechanism including a sun gear 11 on said bushing and connected to said driving sleeve by teeth 12 on said gear in holes 12ª in said sleeve. The sun gear is adapted to mesh with pinions 13 journaled on studs 15 projecting from and fixed to a carrier 17 fast on the driven shaft. Encircling and meshing with said pinions is an internal gear 19 rotatively mounted within a flange 21 projecting from said frame in a direction opposite to the bearing boss 3, referred to. This flange may have an oil inlet 23 communicating with a recess 25 for properly lubricating said internal gear.

Interposed between parts of the planetary gear mechanism is a device whereby the driven shaft may be started and stopped and the speed of rotation transmitted from the driving to the driven shaft may be varied and controlled with any nicety desired. To accomplish this the carrier 17, referred to, is provided with a peripheral friction surface 27 in opposition to and spaced from an internal friction surface 29 on a flange 31 projecting from said internal gear and overlying said carrier. Interposed between said surfaces is a member typified herein as a strap 33 of steel or other appropriate material having surface strips 35 of leather or other suitable friction material on opposite sides thereof. This strap is adapted either to be expanded into frictional engagement with the internal gear surface, thereby freeing itself from the carrier surface, or said strap is adapted to be contracted into frictional engagement with said carrier surface, thereby freeing itself from said internal gear surface. To accomplish this one end of said strap is anchored to the frame and the opposite end is made adjustable. The anchoring means comprises a pivot screw 36 entered through an ear 36ª and threaded to an opposed ear 36ᵇ projecting up from the frame 21. A stud 37 projects from the ear 36ª and receives a sleeve 39 having a sleeve nut 40 fast thereon. The adjustable end of the strap is also pivoted to a similar stud 41 receiving a sleeve 43 having a sleeve nut 45 fast thereon. Connecting these sleeves is a shaft 47 having a right and left hand threaded engagement therewith. To turn said shaft it may be provided with a handle 49 fast thereon conveniently at a point between said sleeves 40 and 45.

When the internal gear is free to rotate, if there is any opposition to rotation of the driven shaft the planetary pinion carrier will remain stationary and there will be no rotation imparted from said driving to said driven shaft. When, however, rotation of said internal gear is checked or arrested the planetary pinions will travel around the same and thereby rotate the carrier and the driven shaft. By adjusting the handle the strap can be caused variably to press against said internal gear and impart a variable speed of rotation to said carrier and its shaft.

By rocking the handle from its dotted position down to its full line position the strap is released from its engagement with the internal gear and is contracted against the surface of the carrier and may act as a brake thereon to arrest the rotation of the driven shaft. By varying the adjustment of the handle the pressure of the strap may be varied and the driven shaft may be gradually slowed down or stopped as desired.

By this invention there is provided a simple, compact, effective transmission mechanism capable of readily varying the speed of rotation transmitted from a driving to a driven shaft as desired. The provision of the screw shaft enables the strap to be expanded or contracted easily and when the strap is set in a position of adjustment the screw arrangement is such that it automatically holds the strap in such position without danger of the shifting thereof therefrom. This is advantageous not only in holding the internal gear or the carrier stationary, but also in permitting a predetermined slip between the strap and said parts in order to maintain a desired speed.

It will be understood that while the sleeve is shown herein as the driving shaft and the shaft journaled therein is shown as the driven shaft the arrangement might be reversed and the inner shaft might be the driving shaft and the sleeve might be the driven shaft. Also other elements might be substituted for the driving and driven shafts if desired.

Having described one illustrative embodiment of the invention without limiting the same thereto, what I claim as new and desire to secure by Letters Patent is:

1. A transmission mechanism comprising in combination, driving and driven shafts, a sun gear fast on said driving shaft, an internal gear, a carrier fast on said driven shaft, planetary gears on said carrier meshing with said sun and internal gears, a non-rotative friction strap interposed between said internal gear and carrier, and means for adjusting said strap into frictional engagement with said internal gear or carrier.

2. A transmission mechanism comprising in combination, driving and driven elements, a gear fast on one, a carrier fast on the other, an internal gear, planetary gears on said carrier, and speed controlling friction means for engagement either with said internal gear or with said carrier.

3. A transmission mechanism comprising in combination, driving and driven elements, a gear fast on one, a carrier fast on the other, planetary gears on said carrier, a second gear, and a friction member for checking or arresting either said carrier or said second gear.

4. A transmission mechanism comprising in combination, driving and driven elements, planetary gear means for transmitting movement from one of said elements to the other, and means interposed between parts of said planetary gear means having provision for checking or arresting movement of either of said parts.

5. A transmission mechanism comprising in combination, driving and driven elements, planetary gearing and a friction device having provision for rendering said planetary gearing effective to transmit movement from one of said elements to the other and having provision for acting as a brake to arrest one of said elements.

6. A transmission mechanism comprising in combination, driving and driven elements, planetary gearing having relatively rotatable parts provided with friction surfaces and non-rotative rotation restraining means expansible into engagement with one of said surfaces or contractible into engagement with the other surface.

7. A transmission mechanism comprising in combination, driving and driven elements, a gear fast on one, a second gear, a carrier, gears on said carrier meshing with said gears, said carrier and said second gear having opposed friction surfaces, a non-rotative friction member interposed between said surfaces, and means for expanding or contracting said member into frictional engagement with one or the other of said surfaces.

8. A transmission mechanism comprising in combination, a sleeve shaft, a shaft therein, planetary gearing, and a friction member having provision for rendering said planetary gearing effective to transmit rotation from one of said shafts to the other and provision for acting as a brake to arrest rotation of one of said shafts.

9. A transmission mechanism comprising in combination, driving and driven elements, planetary gearing therefor, and a friction member coöperating with the latter and adjustable to one position to cause transmission of rotation from one of said elements to the other and to a different position to arrest rotation of one of said elements.

10. A transmission mechanism comprising in combination, driving and driven elements; planetary gearing including a sun gear, a carrier, planetary gears thereon, and an internal gear meshing with the latter; and adjustable means for holding either said internal gear or said carrier stationary.

11. A transmission mechanism comprising in combination, a frame, driving and driven elements journaled therein, a sun gear fast on one of said elements, a carrier fast on the other, an internal gear rotative in said frame, planetary gears meshing with said sun and internal gears, and a friction strap having provision for causing the same to engage either said internal gear or said carrier to check or arrest rotation thereof.

12. A transmission mechanism comprising in combination, driving and driven elements, planetary gearing, a strap adjustable for engagement with one part of said planetary gearing to render the latter effective to transmit rotation from one of said shafts to the other, said strap being adjustable for engagement with another part of said planetary gearing for arresting rotation of one of said elements.

13. A transmission mechanism comprising in combination, driving and driven elements, planetary gearing, and adjustable means interposed between and for frictional engagement with different parts of said planetary gearing for varying rotative movement transmitted therethrough from one of said elements to the other or for acting as a brake to arrest rotation of one of said elements.

14. A transmission mechanism comprising in combination, driving and driven elements, planetary gearing, a non-rotative friction strap interposed between parts of said planetary gearing, and means for expanding and contracting said strap into engagement with said parts.

15. A transmission mechanism comprising in combination, driving and driven elements, planetary gearing, a non-rotative friction strap interposed between parts of said planetary gearing, and means including a screw for expanding and contracting said strap into engagement with said parts.

16. A transmission mechanism comprising in combination, driving and driven elements, planetary gearing, a non-rotative friction strap interposed between parts of said planetary gearing, and means including a right and left hand screw for expanding and contracting said strap into engagement with said parts.

17. A transmission mechanism comprising in combination, driving and driven elements, planetary gearing, a non-rotative friction strap interposed between parts of said planetary gearing, and means including a shaft having a threaded connection with said strap and a handle for turning said shaft for expanding and contracting said strap into engagement with said parts.

18. A transmission mechanism comprising in combination, driving and driven elements, planetary gearing, a frame therefor, a friction member, means for connecting said friction member to said frame, and means for adjusting said member into frictional engagement with different parts of said planetary gearing to vary the speed of movement transmitted from one of said elements to the other.

In testimony whereof, I have signed my name to this specification, in the presence of two subscribing witnesses.

MORRIS P. HOLMES.

Witnesses:
HARRY A. WILEY,
R. M. PADDOCK.